United States Patent [19]

Seita et al.

[11] 4,065,414
[45] Dec. 27, 1977

[54] POLYION COMPLEX AND POLYION COMPLEX FILM

[75] Inventors: Toru Seita; Akihiko Shimizu, both of Shin-nanyo, Japan

[73] Assignee: Toyo Soda Manufacturing Co., Ltd., Yamaguchi, Japan

[21] Appl. No.: 712,397

[22] Filed: Aug. 6, 1976

[30] Foreign Application Priority Data

Aug. 13, 1975 Japan ............................... 50-97509
Aug. 20, 1975 Japan ............................... 50-100227

[51] Int. Cl.² .......................... C08L 1/28; C08G 81/02
[52] U.S. Cl. ............................... 260/17 R; 204/159.12; 210/22 CD; 210/32; 526/263; 526/293; 526/310; 526/317
[58] Field of Search .................. 260/17; 526/310, 317, 526/265, 293; 204/159.12; 210/22, 32

[56] References Cited

U.S. PATENT DOCUMENTS

| 2,780,604 | 2/1957 | Clark et al. | 526/310 |
| 3,414,509 | 12/1968 | Bloch | 526/310 |
| 3,754,055 | 8/1973 | Rembaum | 526/265 |
| 3,929,750 | 12/1975 | Eishun et al. | 526/317 |
| 3,963,662 | 6/1976 | Fujiwara | 260/47 UA |

Primary Examiner—Edward M. Woodberry
Attorney, Agent, or Firm—Oblon, Fisher, Spivak, McClelland & Maier

[57] ABSTRACT

A crosslinkable polyion complex is prepared by reacting a polycation polymer having an ethylenic double bond at a terminal position in the repeating unit of the polymer with a polyanion polymer. A polyion complex film is prepared by dissolving the crosslinkable polyion complex in a solvent mixture of water-organic solvent-acid, base or salt and then forming a film by casting or coating the solution on a substrate.

9 Claims, No Drawings

POLYION COMPLEX AND POLYION COMPLEX FILM

BACKGROUND OF THE INVENTION

The present invention relates to a crosslinkable polyion complex having an ethylenic double bond at a terminal position in the repeating unit of the polymer, and a polyion complex film. Previously, in processes for producing polyion complexes, combinations of two organic compounds, such as a combination of sodium polyacrylate or sodium polystyrene-sulfonate with a polyvinylbenzyltrimethyl ammonium salt have been used. (Encyclopedia of Chemical Technology, 6, 117-132; 1968). Other polyion complexes which have been synthesized are prepared by reacting an anionic, partial substituent of polyvinyl alcohol with a polyvinyl pyridinium salt. However, the conventional polyion complexes have low durability and low strength, and films made of the conventional polyion complex have unsatisfactory strength.

A need therefore, continues to exist for a method of obtaining polyion complexes having improved strength, especially for polyion complexes which form films.

SUMMARY OF THE INVENTION

Accordingly, one object of the present invention is to provide a process for preparing a crosslinkable polyion complex which contains ethylenic double bonds.

Another object of the invention is to provide a process for preparing a film having high strength from a polyion complex.

Briefly, these objects and other objects can be attained by preparing a polyion complex by reacting a polycation polymer having an ethylenic double bond at a terminal position in the repeating unit of the polymer with a polyanion polymer. A film can then be prepared by dissolving the polyion complex containing ethylenic double bonds in a solvent mixture of water-an organic solvent-an acid, base or salt, and then casting the solution of the polyion complex into a film.

DETAILED DESCRIPTION OF THE PREFERRED EMBODIMENTS

The polyion complexes of the invention contain a terminal ethylenic double bond in the repeating units of the polymer. The complexes are crosslinkable when subjected to irradiation or heat at the double bond in the preparation of dialysis and ultra-filtration films. The extent of crosslinking of the polyion complex can be increased without the necessity of a complex chemical method because the polyion complex contains terminal ethylenic double bonds. Because the polyion complex film contains terminal ethylenic double bonds, the polyion complex film is crosslinkable by heat, light or high energy radiation to form a crosslinked film of increased strength. It is also possible to copolymerize the polyion complex with various vinyl monomers in the film forming step.

The polyion complex films of the present invention are different from the conventional polyion complex films. Previously, conventional polyion complex films have been crosslinked by reacting the phenolic hydroxyl groups of the polymer with formalin. On the other hand, the polyion complex film prepared by the process of the present invention can be crosslinked by treating it with heat, light such as ultraviolet rays, gamma rays, high energy radiation, or the like and not by a chemical treatment. The polyion complexes of the present invention can be produced by reacting a polycation polymer having a terminal ethylenic double bond in the repeating units of the polymer with a polyanion polymer. When the polyion complex is crosslinked through the terminal ethylenic double bonds by heating, light or high energy radiation, films of increased crosslinked density can be obtained which are useful for dialysis or ultrafiltration. Because of the presence of the ethylenic double bonds in the polymers complicated chemical treatments are unnecessary.

The polyion complex films can be used as dialysis films, ultrafiltration films, electrical conductive coating films, antistatic coating films and films for medical uses, and surface coating films. The polyion complex can be reacted with another vinyl monomer. Suitable polyanion polymers used for producing the polyion complex of the invention include polystyrenesulfonic acid and alkali salts thereof such as sodium polystyrenesulfonate; polyvinylsulfonic acid and alkali polyvinylsulfonate; polyacrylic acid, polymethacrylic acid, carboxymethyl-cellulose, alginic acid and alkali salts thereof. Suitable polycation polymers having a terminal ethylenic double bond in the repeating units of the polymer used for producing the polyion complex of the invention include compounds having the following basic units.

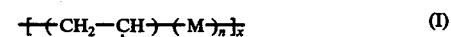

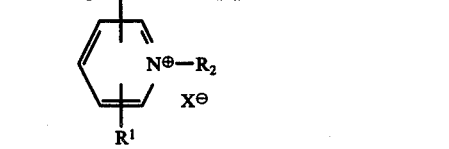

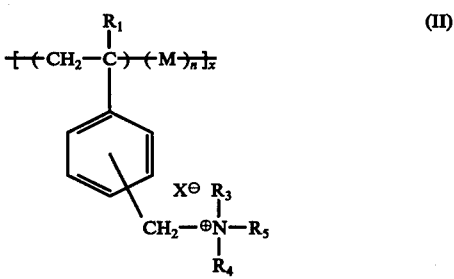

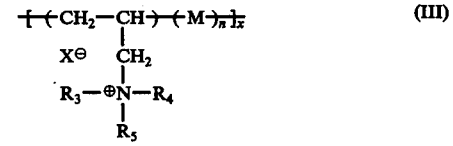

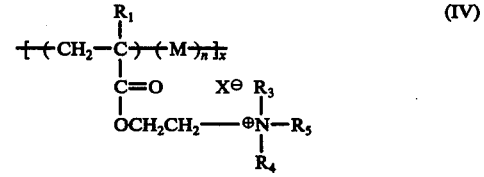

wherein $R_1$ represents hydrogen, or a $C_{1-4}$ alkyl group; $R_2$ represents a group having the formula

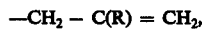

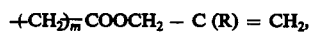

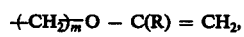

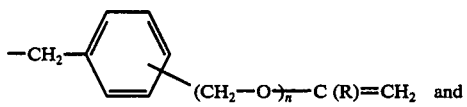

R is hydrogen or $C_{1-4}$ alkyl, $m$ is 1 to 3, and $n$ is 0 or 1; $R_3$, $R_4$ and $R_5$ represent $C_{1-4}$ alkyl or alkylol and at least one of $R_3$, $R_4$ and $R_5$ is the group of $R_2$ or a group having the formula

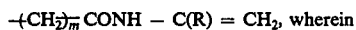

R is hydrogen, or a $C_{1-4}$ alkyl and $m$ is 1 or 2; $n$ is 0 or an integer less than 40,000; $x$ is an integer of 10 to 50,000; M represents a vinyl monomer having an ethylenic double bond such as styrene, α-methylstyrene, acrylonitrile, methacrylonitrile, butadiene, etc.; and X represents a halogen atom or hydroxyl group.

When a strong electrolyte such as sodium polystyrenesulfonate is used as the polyanion polymer, the polyion complex is produced by reacting the polyanion polymer with the polycation polymer in an equivalent ratio of 1 : 1 because of the combination of a strong electrolyte with a strong electrolyte. On the other hand, when a weak electrolyte such as polyacrylic acid is used as the polyanion polymer, the degree of dissociation of the carboxylic acid can be controlled by varying the amount of the aqueous alkali solution whereby polyion complexes can be produced by varying the ratio of the polyanion polymer to the polycation polymer.

Because the polyion complexes of the invention have terminal ethylenic double bonds, the strength of the resulting polyion complex film can be improved by crosslinking the polyion complex after or during film formation. The polyion complexes can be easily prepared by mixing a solution of a polyanion polymer with a solution of polycation polymer. In the reaction of the two materials the polyanion polymer and the polycation polymer are separately dissolved in water or a water compatible solvent such as methanol, ethanol, acetone, tetrahydrofuran, N,N-dimethylformamide, N,N-dimethylacetamide, N.N-dimethylsulfoxide, dioxanecyclohexanone, acetonitrile, or the like. The polyion complexes can then be produced by mixing both solutions. It is also possible to prepare the polyion complex by adding a solid polyanion polymer to a solution of the polycation polymer or by adding a solid polycation polymer to a solution of the polyanion polymer, although this technique is not preferable. When a polycarboxylic acid is used as the polyanion polymer, an aqueous alkali solution can be added if desired. In this case, the aqueous alkali solutions can be prepared by dissolving an alkali metal or alkaline earth metal hydroxide such as NaOH, KOH, $Ca(OH)_2$ in water. The concentration of the polycation polymer or the polyanion polymer in the solutions can be in the range of 0.01 to 60 wt.%, preferably 0.1 to 10 wt.%. The ratio of the polycation polymer is in a range of 0.05 to 20 on an equivalent basis, and the reaction temperature is preferably in a range of 0° to 80° C.

In the preparation of the film of the polyion complex, the polyion complex is dissolved in a solvent mixture of water-a water compatible organic solvent-an acid, base or salt. Suitable organic solvents include methanol, ethanol, N,N-dimethylacetoamide, N,N-dimethylformamide, N,N-dimethylsulfoxide, acetone, tetrahydrofuran, dioxane, cyclohexanone, acetonitrile and mixtures thereof. Suitable acids, bases and salts used in the solvent mixture include hydrochloric acid, sulfuric acid, nitric acid; alkali metal hydroxides such as sodium hydroxide, potassium hydroxide; alkali metal and alkaline earth metal halides, nitrates, sulfates, perchlorates and persulfates such as sodium chloride, potassium bromide, calcium chloride, and the like. A solution of the polyion complex in the solvent mixture at a concentration of 5 to 70 wt.%, preferably 10 to 40 wt.% is used as a casting solution. It is also possible to use both a solution of the polycation polymer and a solution of the polyanion polymer in the solvent mixture, as casting solutions. In the casting operation the solution is poured on a flat surface of glass, polytetrafluoroethylene, polyethyleneterephalate, or the like to yield a film of uniform thickness. The film is dried at room temperature to 90° C, preferably room temperature to 50° C for 1 hour to 2 hours.

The film can also be formed by a pressure method wherein a casting solution of the polyion complex in the solvent mixture is passed between two or more plates while being heated by a support method wherein the casting solution of the polyion complex is coated on a support or by immersing a support in the casting solution to support the polyion complex film on a support. Suitable supports include cloth, gauze, nets made of synthetic fiber such as polyester, polyvinyl chloride, polyvinylidene chloride; asbestos, glass fiber and the like.

The polyion complex supported on a flat plate or a support is immersed in water or a water compatible organic solvent or a mixture thereof to 0° to 80° C, preferably 20° to 50° C.

The film which is cast on a flat plate can be peeled from the plate after a desired time whereby a novel polyion complex film is obtained.

The adhesive strength of the polyion complex on the support is sufficient. Moreover, the polyion complex in the film possesses ethylenic double bonds so it is crosslinkable when heated or when subjected to ultraviolet irradiation, or the like. For example, it is possible to form a film after a radical initiator such as α,α-azobisisobutyronitrile is added to the casting solution. It is also possible to add a photosensitive agent such as benzophenone to the film and then to subject the film to ultraviolet rays, or the like. The temperature of the crosslinking treatment can be conducted at room temperature to 100° C for 5 minutes to 10 hours.

The specific polycation polymer is used in the preparation of the films, and accordingly the polyion complex in the prepared film has ethylenic double bonds. The polyion complex film of the present invention can be used in various applications such as films for dialysis or ultrafiltration, and medical materials such as artificial lungs.

Having generally described the invention, a more complete understanding can be obtained by reference to certain specific examples, which are included for purposes of illustration only and are not intended to be limiting unless otherwise specified.

PREPARATION 1

Into a 2 liter beaker, 3 g of a polycation polymer having repeating units of the formula

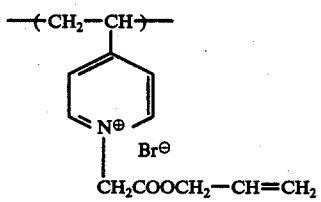

containing a site of unsaturation and which had a molecular weight of $1 \times 10^5$ and a quaternary degree of 53% was dissolved in 800 ml of stirred distilled water to prepare a solution. Into a 500 ml beaker, 1.5 g of sodium polystyrenesulfonate (molecular weight: $2.2 \times 10^6$) were charged and dissolved in 400 ml of stirred distilled water to prepare a solution.

The solution of sodium polystyrenesulfonate was added dropwise to the stirred solution of the polycation polymer at room temperature and a white precipitate formed. After the addition, the stirring was continued for about 1 hour.

The white precipitate was collected by filtration, washed with distilled water, then washed with methanol and dried under reduced pressure. According to an infrared spectrum analysis of the product, an ester band at 1720 cm$^{-1}$ and the bands of an SO$_2$ group at 1180 cm$^{-1}$ and 1035 cm$^{-1}$ were found, thus confirming that the product was the desired polyion complex. An elemental analysis of the product showed that the nitrogen content was 5.14%, thereby confirming that the product was the neutral polyion complex.

PREPARATIONS 2 to 5

In accordance with the process of Preparation 1, a solution of a polycation polymer, poly-4-vinylpyridine having a molecular weight of $1 \times 10^5$ and having repeating units of the formula

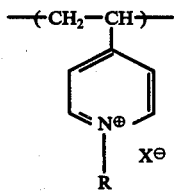

and a solution of polyanion polymer (a 0.8 wt.% aqueous solution) were separately prepared, and then reacted. The desired polyion complex was then obtained after appropriate post treatment of the reaction solution. The results are shown in Table 1.

Table 1

| Prep. | Polycation polymer R | X | Quaternary degree (%) | Amt. (g) |
|---|---|---|---|---|
| 2 | —CH$_2$—CH=CH$_2$ | Br | 78 | 3.0 |
| 3 | —CH$_2$—⟨C$_6$H$_4$⟩—CH=CH$_2$ | Cl | 43 | 4.2 |
| 4 | —CH$_2$COOCH=CH$_2$ | Br | 67 | 6.0 |
| 5 | —CH$_2$CH=CH$_2$ | Br | 78 | 3.5 |

Polyanion polymer

| Prep. | Structure | M.W. | Amt. (g) | Product Polyanion complex Yield (g) |
|---|---|---|---|---|
| 2 | —(CH$_2$—CH(C$_6$H$_4$SO$_3$Na))— | $22 \times 10^6$ | 2.8 | 4.7 |
| 3 | —(CH$_2$—CH(SO$_3$Na))— | $8 \times 10^3$ | 1.2 | 3.9 |
| 4 | —(CH$_2$—CH(COONa))— | $28 \times 10^5$ | 1.0 | 6.2 |
| 5 | [cellulose-like COONa structure] | 1000 (cps) | 2.2 | 4.4 |

PREPARATION 6

Into a 2 liter beaker, 3 g of a polycation polymer having repeating units of the formula

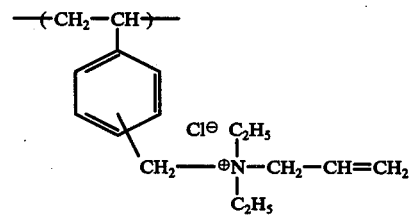

and having a molecular weight of $2.7 \times 10^4$ and a quaternary degree of 83% were dissolved in 700 ml of stirred water to prepare a solution. Also, in another beaker, 1.8 g of sodium polyvinylsulfonate (molecular weight: $8 \times 10^3$) were dissolved in 500 ml of stirred distilled water to prepare a solution.

The solution of sodium polyvinylsulfonate was added dropwise to the solution of polycation polymer and a white precipitate formed. After the addition, stirring was continued for about 1 hour. The white precipitate was collected by filtration, washed with distilled water, then washed with methanol and dried under reduced pressure. According to infrared analysis of the product, bands indicative of a substituted benzene ring at 885 cm$^{-1}$ and 832 cm$^{-1}$, and bands indicative of an SO$_2$ group at 1180 cm$^{-1}$ and 1032 cm$^{-1}$ were found, thus confirming that the product was the polyion complex.

The polyion complex was neutral and the yield was 3.2 g.

PREPARATION 7

A 12.2 g amount of the polycation polymer of Example 2 was dissolved in 1200 ml of distilled water.

On the other hand, 25 g of polyacrylic acid (molecular weight $4.1 \times 10^5$) were dissolved in 1 liter of distilled water.

The solution of polyacrylic acid was added dropwise to the solution of polycation.

The precipitate which was obtained, was filtered and treated in accordance with the procedure of Preparation 1 whereby a polyion complex wherein 18% of carboxylic acid was bonded, was obtained. The yield was 13 g.

PREPARATION 8

In accordance with the process of Preparation 7, the same reaction and post treatment was conducted except that 0.15 g of sodium hydroxide was added to the solution of polyacrylic acid. The product was the polyion complex wherein about 55% of carboxylic acid was bonded.

The yield was 11.0 g.

The polyion complexes having different ratios of polycation to polyanion can be produced by varying the amount of alkali.

EXAMPLE 1

A polyion complex used in the preparation of a polyion complex film was produced by mixing a 7% aqueous solution of polyvinylbenzylmethylallyl ammonium chloride (molecular weight: $24 \times 10^4$; quaternary degree 83%) with a 5% aqueous solution of sodium polystyrenesulfonate (molecular weight $7.5 \times 10^6$) at room temperature.

The resulting polyion complex was dissolved in a solvent mixture of water-acetone-sodium bromide (60:20:20 by weight) to form a casting solution to a concentration of 20 wt.%.

The casting solution was poured onto a glass plate having a length of 15 cm and a width of 15 cm to yield a cast film of uniform thickness. The solvent was vaporized at room temperature for about 30 minutes and the glass plate was immersed in water for 5 minutes without stirring. The polyion complex film was peeled from the glass plate and was further immersed in water for 2 hours.

The resulting polyion complex film had a water content of 78.6%, a thickness of 0.321 mm, and a water permeability of 0.12 ml/min-cm$^2$ (1 Kg/cm$^2$ pressure).

EXAMPLE 2

The process of Example 1 was repeated except that the casting solution was of a concentration of 30 wt.%, instead of 20 wt.%, and the polyion complex film was prepared.

The polyion complex film had a water content of 71.6%, a thickness of 0.213 mm, a water permeability of 0.05 ml/min-cm$^2$ (1 Kg/cm$^2$ pressure) and was not deformed upon immersion in boiling water.

EXAMPLE 3

A polyion complex was produced by mixing a 6% aqueous solution of a polycation polymer having repeating units of the formula

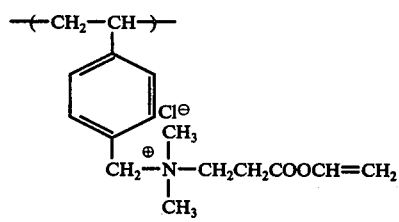

and having a molecular weight of $7.5 \times 10^5$ and a quaternary degree of 56% with a 5% sodium polystyrenesulfonate (molecular weight: $2.5 \times 10^6$) solution.

In accordance with the process of Example 1, a solution of the polyion complex at a concentration of 20 wt.% was cast. A solvent mixture of water-acetone-sodium bromide (60:20:20) was used in the preparation of a cast solution. The resulting polyion complex film had a thickness of 0.225 mm and a water content of 80.2%.

EXAMPLE 4

A polyion complex was produced by mixing a 7% aqueous solution of a polycation polymer having repeating units of the formula

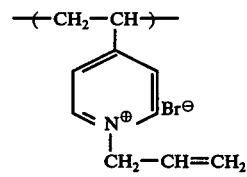

and having a molecular weight of $1 \times 10^5$ and a quaternary degree of 87% with a 5% aqueous solution of sodium polystyrenesulfonate (molecular weight: $2.5 \times 10^6$). A casting solution was prepared by dissolving the resulting polyion complex in a solvent of water-acetone-sodium bromide (60:20:20) at a concentration of 35 wt.%.

The casting solution was admixed with benzophenone and was coated on a gauze made of polyvinylidene chloride (70 mesh). The cast material was dried at room temperature for 1 minute and then was immersed in water to form a white film. The water content was 79.2%.

EXAMPLE 5

The polyion complex film of Example 4 was irradiated by a high pressure mercury arc lamp in water at 60° C for 2 hours.

The polyion complex film was immersed in a solvent mixture of water-acetone-sodium bromide (60:20:20). The ratio of the soluble matter to the insoluble matter was as follows.

As a reference experiment, the results from a film not exposed to radiation were obtained.

|  | Soluble matter | Insoluble matter |
| --- | --- | --- |
| Non-irradiated film | 100% | 0% |
| irradiated | 35% | 65% |

We claim:

1. A polyion complex produced by reacting a polyanion polymer selected from the group consisting of polystyrenesulfonic acid, polyvinylsulfonic acid, polyacrylic acid, polymethacrylic acid, carboxymethyl cellulose, alginic acid or an alkali salt thereof with a polycation polymer having a terminal ethylenic double bond in the repeating units of the polymer and having repeating units of the formula:

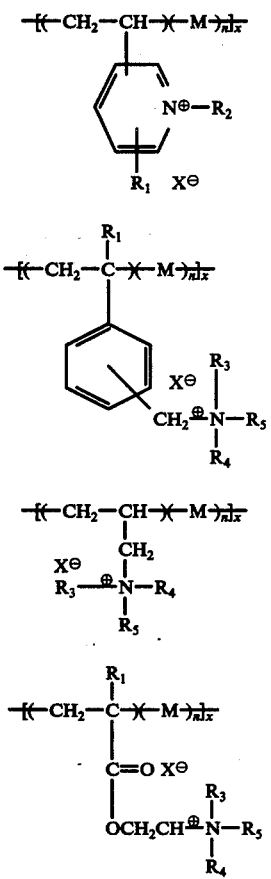 (I)

(II)

(III)

(IV)

wherein $R_1$ represents hydrogen, or a $C_{1-4}$ alkyl group; $R_2$ represents a group having the formula:

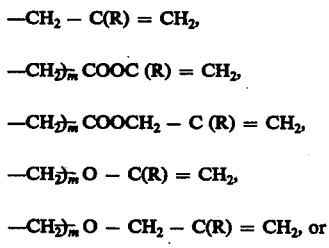

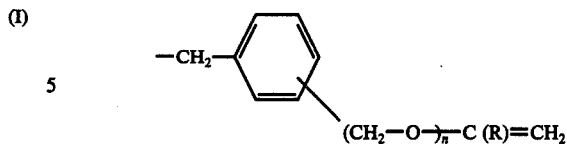

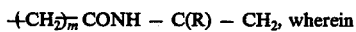

wherein R is hydrogen or a $C_{1-4}$ alkyl group, $m$ is 1 to 3 and $n$ is 0 or 1; $R_3$, $R_4$ and $R_5$ represents a $C_{1-4}$ alkyl group or an alkylol group and at least one of $R_3$, $R_4$ and $R_5$ is the group of $R_2$ or a group having the formula:

$-(CH_2)_{\overline{m}} CONH - C(R) - CH_2$, wherein

R is hydrogen or a $C_{1-4}$ alkyl group and $m$ is 1 or 2; $n$ is 0 or an integer less than 40,000; $x$ is an integer of 10 to 50,000; M represents a vinyl monomer having an ethylenic double bond selected from the group consisting of styrene, α-methylstyrene, acrylonitrile, methacrylonitrile, and butadiene; and X represents a halogen atom or a hydroxyl group.

2. A film of the polyion complex of claim 1.

3. The polyion complex film of claim 2, which is formed by casting a solution of the polyion complex in a solvent mixture of water- a water compatible organic solvent-an acid, base or salt.

4. The polyion complex film of claim 2, which is supported on a cloth, gauze or net.

5. A polyion complex film of claim 2, which is crosslinked by heat or irradiation.

6. The polyion complex film of claim 3, wherein said water compatible organic solvent is methanol, ethanol, N,N-dimethylacetoamide, N,N-dimethylformamide, N,N-dimethylsulfoxide, acetone, tetrahydrofuran, dioxane, cyclohexanone, acetonitrile or mixtures thereof.

7. The polyion complex film of claim 3, wherein the concentration of said polyion complex in said solvent mixture ranges from 5 to 70 wt.%.

8. The polyion complex film of claim 3, wherein said cast solution is immersed in water, a water compatible organic solvent, or mixtures thereof at 0° to 80° C.

9. The polyion complex film of claim 3, wherein said acid is hydrochloric acid, sulfuric acid or nitric acid; said base is an alkali metal hydroxide and said salt is an alkali metal or alkaline earth metal halide, nitrate, sulfate, perchlorate or persulfate.

* * * * *